July 26, 1932.   F. H. VAN HOUTEN   1,869,033
DOUGH HANDLING APPARATUS
Filed July 14, 1931   3 Sheets-Sheet 1

Inventor
Frank H. Van Houten,
By Church & Church
His Attorneys

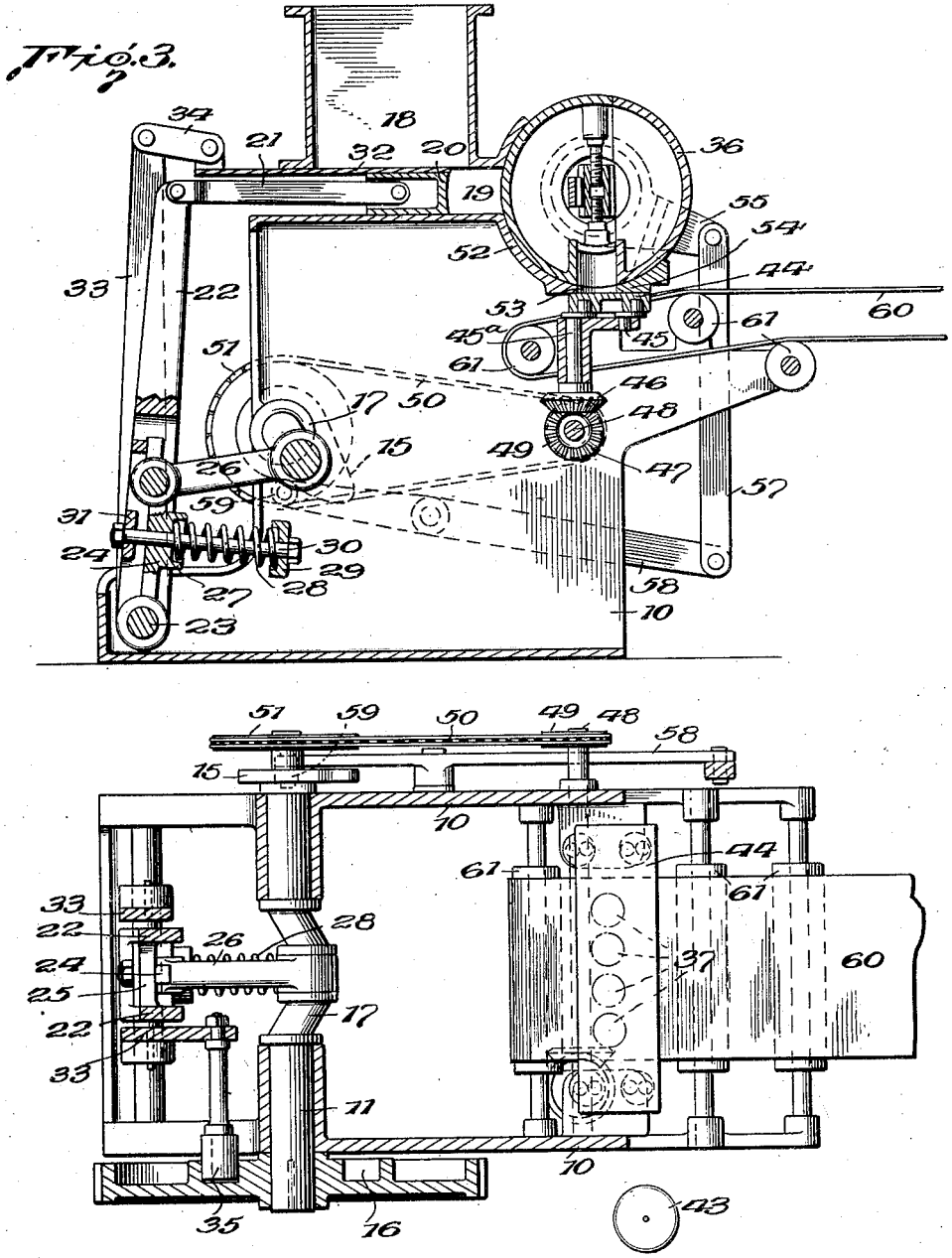

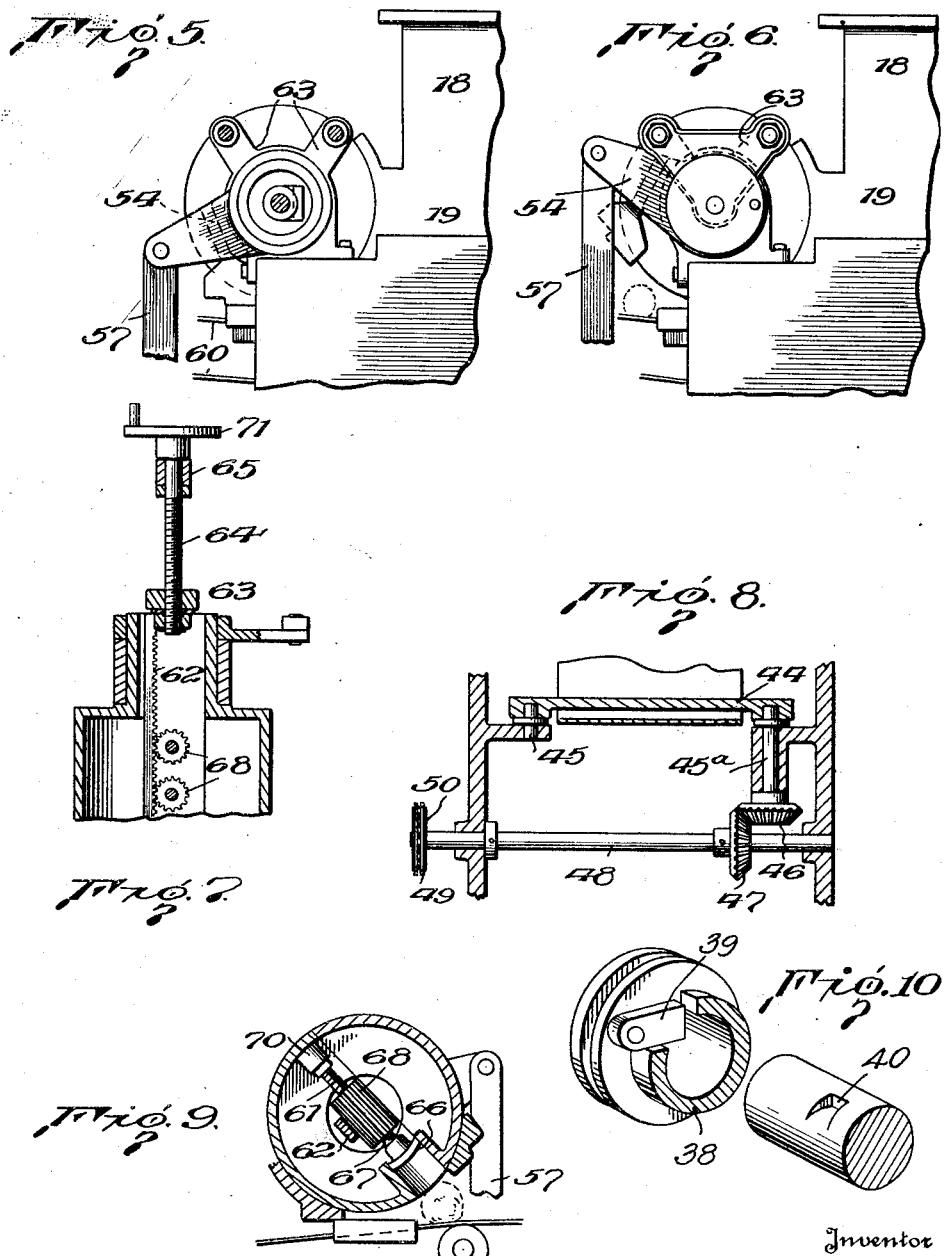

Patented July 26, 1932

1,869,033

UNITED STATES PATENT OFFICE

FRANK H. VAN HOUTEN, OF BEACON, NEW YORK, ASSIGNOR TO DUTCHESS TOOL COMPANY, OF BEACON, NEW YORK, A CORPORATION OF NEW YORK

DOUGH HANDLING APPARATUS

Application filed July 14, 1931. Serial No. 550,784.

This invention relates to improvements in dough handling apparatus, and particularly to a machine which will be termed a combined dough divider and rounder.

The primary object of the invention is to provide a so-called combined dough divider and rounder wherein one or more bodies of dough are measured in a measuring cylinder or divider head, and, while still retained in that element, are rounded up, so to speak, into individual balls of dough.

More specifically, the invention contemplates an apparatus comprising a hopper communicating with the compression box; a dough rounding-up surface; and a measuring cylinder or divider head, intermittently rotatable by mechanism which will carry the pockets of said cylinder or head past the compression box to a point where they will be in registry with the rounding-up surface, the operation of said mechanism being such that the cylinder is at rest when the pockets are in registry with the rounding-up surface whereby portions of dough in the pockets may be rounded up into balls as before mentioned. In other words, during the rotation of the cylinder or divider head, the pockets will pass the compression box and receive lumps of dough, and will then proceed to the rounding-up surface where they will stop to permit the processing or rounding-up of the lumps of dough. Upon the next rotation of the divider head, these rounded-up lumps of dough are discharged on to a traveling surface and the pockets again brought into registry with the compression box for another charge of dough.

During the rounding-up of the lumps of dough in the measuring head pockets it is necessary to enlarge the cavities in which the lumps are confined. In view of this, the invention comprises certain details of construction for providing clearance between the cylinder head and rounding-up surface without interfering with the discharge of the lumps of dough from the pockets after the rounding-up step.

With these and other objects in view, the invention consists in certain details of construction and combinations and arrangements of parts all as will hereinafter be more fully described and the novel features thereof particularly pointed out in the appended claims.

In the accompanying drawings:

Fig. 3 is a vertical sectional view on the line 3—3 of Fig. 2.

Fig. 4 is a horizontal section on the line 4—4 of Fig. 1.

Fig. 5 is a side elevation, partly in section, looking toward one end of the dough dividing cylinder.

Fig. 6 is an elevation, similar to Fig. 5, showing some of the parts in a different position.

Fig. 7 is a horizontal section through the cylinder.

Fig. 8 is a vertical section through the rounding-up member.

Fig. 9 is a transverse section through the cylinder; and

Fig. 10 is a detail view of one end of the divider head.

Figure 1:
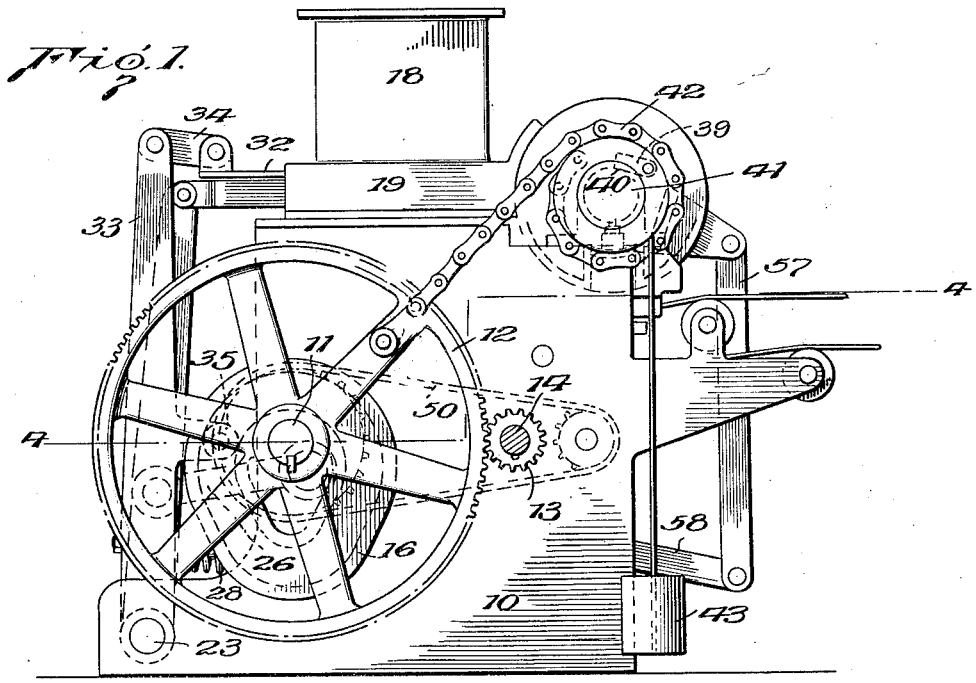
Figure 1 is a side elevation of a machine embodying the present improvements.
Figure 2:
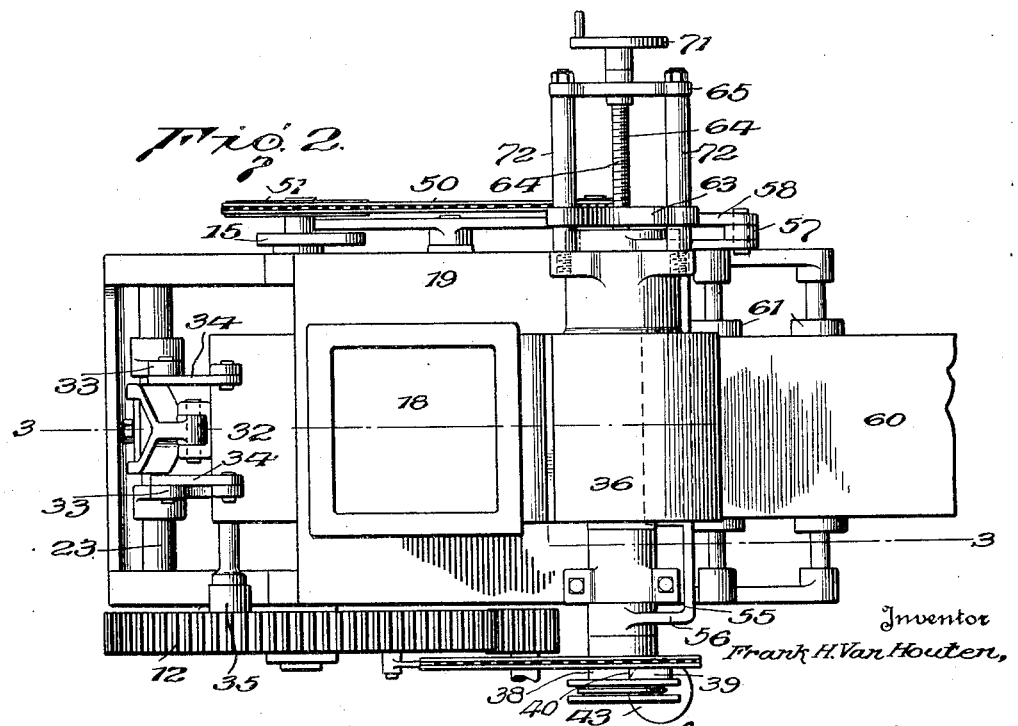
Fig. 2 is a top plan view.

In the preferred construction of the present apparatus, the main frame comprises side members 10, in which there is journaled a main operating shaft 11 carrying a gear 12, meshing with a second gear 13 on a drive shaft 14 journaled in the frame, and to which motion is imparted from any suitable source. The main operating shaft 11 also carries a pair of cams, 15, 16, and a crank 17. Above the main frame, there is a hopper 18, communication with the compression box 19 below it, and slidable in said compression box is a plunger 20 connected by links 21 to dual operating levers 22 pivoted on a shaft 23 in the base of the frame. Also pivoted on said shaft is a comparatively short lever 24 adapted to engage, when moved in one direction, against an abutment 25 carried by the plunger levers. This short lever 24 is connected by a link 26 to the crank 17 on the main operating shaft. Said comparatively short lever also carries a seat 27 for one end of a compression spring 28, whose opposite end engages in a seat 29 properly supported by a bolt 30 extending through the spring 28, its seats 27, 29, the short lever 24, and a cross piece 31 on the plunger lever. With this construction, it will be seen that normally the crank and comparatively short lever will advance the plunger in the compression box, but in the event forward movement of the plunger is obstructed by dough in the box, the crank is free to continue its forward movement by reason of the fact that the comparatively short lever may continue its forward movement by compressing the springs. In accordance with the general practice, there is also a knife 32 interposed between the bottom of the hopper and the compression box for severing dough in the box from the main mass of dough in the hopper. This knife is reciprocated by levers 33 pivoted on shaft 23, the upper end of said levers being connected by links 34 to the knife, and the intermediate portion of the lever being provided with a cam roller 35 operatively associated with the cam 16 on the main shaft.

Journaled in the frame is the divider head or divider cylinder 36 formed with a plurality of longitudinally spaced pockets 37, each adapted to receive in increment of dough when it is brought into registry with the mouth of the compression box. In the present instance, this cylinder is rotated intermittently by the following connections. Mounted on the end of the cylinder is a sleeve 38, carrying a pawl 39 which engages a detent 40, or equivalent element, on the cylinder shaft 41, the sleeve being free to turn with respect to the cylinder, except when said pawl is in engagement with said detent. In other words, the sleeve can rotate independently of the cylinder in one direction, but cannot rotate independently of the cylinder in the other direction when the pawl is in its detent on the cylinder shaft. Attached to, and adapted to partially coil around the sleeve, is a chain 42 which is also attached to the gear 12 on the main operating shaft. With the parts in the position shown in Fig. 1, it will be seen that upon the first one-half revolution of the gear in the direction indicated by the arrow, the chain will unwind from the sleeve rotating said sleeve and, by reason of the fact that the pawl is in the detent, will also rotate the cylinder. This one-half revolution of the gear imparts a complete revolution to the measuring cylinder, so that the latter moves all the way around to its original position. During this movement the pockets 37 pass the mouth of the compression box, at which point the pockets will receive charges of the dough. During the next half revolution of the gear, the chain is rewound on the sleeve by the sleeve being reversely rotated, this reverse rotation of the sleeve being accomplished by the weight 43 attached to said sleeve. During this rewinding of the chain, the cylinder is at rest, and it is at this time that the lumps of dough in the pockets are rounded up by the rounding-up surface, the pockets being shown in registry with said rounding-up surface in Fig. 3.

This rounding-up surface 44 may consist of a flat plate mounted on four cranks 45, but one of which cranks is somewhat elongated, as shown at 45a, and is provided at its depending end with a bevel gear 46 which meshes with another bevel gear 47 on a shaft 48 on the main frame, motion being imparted to this shaft by a drive chain 49 extending over gears 50, 51, on said shaft, and the main drive shaft.

In performing this rounding-up step of the increments of dough in the divider cylinder pockets, it is necessary to enlarge the pockets, so that there will be sufficient clearance as not to interfere with the movement of the lumps of dough in the pockets. For this purpose, the lower wall of the compression box is formed with a lip or extension 52 which conforms to the periphery of the divider cylinder. This lip or curved extension terminates at a point overlying the rounding-up surface or plate. This overlying end or edge of the lip is formed with a number of semi-circular recesses corresponding to the number of pockets in the measuring cylinder. This lip is supplemented by a movable extension 54 also formed with semi-circular recesses adapted to register with the recesses in the lip 52, and the circular openings 53, formed conjointly by these recesses register with the pockets in the measuring cylinder. The thickness of this lip and its movable extension is such as to provide the clearance that is necessary to permit free manipulation of the lumps of dough within the pockets by the rounding-up surface or plate. The supplemental lip portion, which has been described as being movable, is carried on a cross piece 55 formed with extensions 56 journaled on the cylinder shaft. Also attached to the cross piece of this lip extension is a link 57 whose end is attached to a lever 58 pivoted intermediate its ends on the main frame, whereby the link may be raised and lowered by means of a cam roller 59 on the lever engaging in the camming surface 15 on the main operating shaft. The formation of the camming surface on the main operating shaft and the disposition of the crank for operating the plunger is such that the knife and plunger can be operated at the proper moments to force increments of dough into the measuring head pockets when said pockets are in registry with the mouth of the depression box. Likewise, the timing of the several parts is such that the link for rocking the lip extension or supplemental lip 54, will be actuated to move said lip a short distance from its normal position, only when the divider head is first rotated from the rounding up position. In other words, after the increments of dough in the pockets have been formed into the desired ball formation, the machine is so timed that the measuring head will then begin to rotate and at this time, the supplemental lip is actuated to move in unison with the head until the pockets have cleared the rounding-up surface or plate sufficiently to permit balls of dough to fall therefrom. After this has taken place, the measuring head continues its rotation, but the supplemental lip is returned to its normal position, due to the formation of its operating cam. That is, it is returned to its normal position in association with the lip 52 so that it will be in position to provide the necessary clearance for the increments of dough carried in the measuring head pockets when they again return to rounding-up position. It should be added that the balls of dough falling from the measuring head pockets are deposited on a traveling surface, preferably an endless moving belt 60 traveling over a series of rollers 61 to a point where the lumps of dough are to be given their next manipulation or treatment.

It will be appreciated that the present machine is particularly adapted for forming and rounding up increments of tough for loaves as distinguished from pan rolls. In view of this, it is preferred that there be means for readily varying the capacity of the individual pockets 37 as these pockets actually measure the increment and, therefore, determine the size of the finished loaf. Such means for altering the capacity of the pockets may comprise a rack 62 mounted on a slidable plate 63 which is engaged by a screw 64 rotatable in a support 65 attached to the main frame. Each pocket 37 has a plunger or bottom plate 66 and each plate has a threaded stem 67 thereon. Stems 67 are threaded axially in gears 68 which also receive threaded elements 69 alined with stems 67. Elements 69 are also threaded in bosses 70 on the interior of the cylinder. The several gears 68 engage the rack 62 and by turning hand wheel 71 and screw 64, plate 63 can be moved along rods 72 and the rack moved longitudinally to rotate the gears and move the plungers 66 in or out to increase or decrease the capacity of the pockets.

What I claim is:

1. In a combined dough divider and rounder, the combination of a member having a measuring cavity therein, means for feeding a body of dough into said measuring cavity, means for rounding up said body of dough in said cavity and means forming an enlargement of said cavity during said rounding-up operation.

2. In a combined dough divider and rounder, a hopper, an intermittently movable measuring head having a cavity therein, means for feeding dough from said hopper to said cavity, and means for rounding up a body of dough in said cavity while said head is stationary.

3. In a combined dough divider and rounder, the combination of a hopper, a compression box communicating with said hopper, a measuring head having a cavity therein, a plunger for forcing dough from said box to said cavity, and means for rounding up a body of dough in said cavity.

4. In a combined dough divider and rounder, the combination of a measuring head having a cavity therein, means for feeding a body of dough into said cavity, a rounding-up surface, means for moving said head to position a body of dough in said cavity on said rounding-up surface and means forming an enlargement of said cavity during said rounding-up of the dough therein.

5. In a combined dough divider and rounder, the combination of a compression box, a rounding-up surface, a measuring head having a cavity therein, means for successively positioning said cavity in registry with said box and rounding-up surface, and a plunger for feeding dough from said box into said cavity.

6. In a combined dough divider and rounder, the combination of an intermittently moving measuring head having a cavity therein, a compression box, means for feeding dough from said box to said cavity, and a rounding-up surface adapted to register with said cavity while said head is at rest.

7. In a combined dough divider and rounder, an intermittently movable measuring head having a cavity therein, means for depositing dough in said cavity while said head is at rest under pressure, a rounding-up surface adapted to engage a body of dough in said cavity, and means for providing clearance for the dough in said cavity when engaged by said rounding-up surface.

8. In a combined dough divider and rounder, the combination of a measuring head having a cavity therein, a compression box, means for depositing dough from said box in said cavity under pressure, a rounding-up surface spaced from the perimeter of said head, means for moving said head to position said cavity in registry with said surface, and a plate interposed between said surface and the perimeter of said head, said plate having an opening therein adapted to form a continuation of said cavity.

9. In a combined dough divider and rounder, the combination of a measuring head having a cavity therein, a compression box, means for depositing dough from said box in said cavity under pressure, a rounding-up surface spaced from the perimeter of said head, means for moving said head to position said cavity in registry with said surface, and a plate interposed between said head and rounding-up surface, said plate having an opening therein adapted to form a continuation of said cavity, and a portion of said plate being removable to permit the discharge of the dough from said cavity.

10. In a combined dough divider and rounder, the combination of a hopper, a measuring head having a cavity therein, means for feeding dough from said hopper to said cavity, a traveling conveyor onto which dough is discharged from said cavity, means for rounding up a lump of dough in said cavity before it is discharged onto said conveyor and means forming an enlargement of said cavity during said rounding-up operation.

FRANK H. VAN HOUTEN.